United States Patent
Kinderman et al.

(10) Patent No.: US 9,443,356 B2
(45) Date of Patent: Sep. 13, 2016

(54) AUGMENTED SITUATION AWARENESS

(71) Applicant: The Boeing Company, Chicago, IL (US)

(72) Inventors: Merian Kinderman, Neu Isenburg (DE); Antonio F. Puentes, Frankfurt (DE); Nils Kneuper, Bergkamen (DE); Andre Lutz, Neu Isenburg (DE)

(73) Assignee: The Boeing Company, Chicago, IL (US)

( * ) Notice: Subject to any disclaimer, the term of this patent is extended or adjusted under 35 U.S.C. 154(b) by 139 days.

(21) Appl. No.: 14/151,529

(22) Filed: Jan. 9, 2014

(65) Prior Publication Data

US 2015/0191075 A1    Jul. 9, 2015

(51) Int. Cl.
| | |
|---|---|
| G09G 5/00 | (2006.01) |
| G06T 19/00 | (2011.01) |
| G09G 5/14 | (2006.01) |
| B64C 1/14 | (2006.01) |
| B64D 43/00 | (2006.01) |

(52) U.S. Cl.
CPC .......... G06T 19/006 (2013.01); B64C 1/1476 (2013.01); B64D 43/00 (2013.01); G09G 5/003 (2013.01); G09G 5/14 (2013.01); G09G 2300/0456 (2013.01); G09G 2360/14 (2013.01); G09G 2380/12 (2013.01)

(58) Field of Classification Search
None
See application file for complete search history.

(56) References Cited

U.S. PATENT DOCUMENTS

| | | | | |
|---|---|---|---|---|
| 7,796,056 | B2 * | 9/2010 | Fein et al. | 340/995.24 |
| 8,514,099 | B2 * | 8/2013 | Seder | B60W 30/095 340/438 |
| 8,589,034 | B2 * | 11/2013 | Kwok | 701/49 |
| 2003/0043470 | A1 * | 3/2003 | Harter et al. | 359/630 |
| 2003/0169213 | A1 | 9/2003 | Spero | |
| 2006/0158715 | A1 * | 7/2006 | Furusawa | B60J 3/04 359/265 |
| 2006/0175859 | A1 | 8/2006 | Isaac | |
| 2007/0103341 | A1 * | 5/2007 | Kreiner et al. | 340/988 |
| 2008/0048101 | A1 | 2/2008 | Romig et al. | |
| 2010/0000517 | A1 * | 1/2010 | Zalusky | F24J 2/38 126/600 |
| 2013/0027394 | A1 * | 1/2013 | Kho et al. | 345/419 |
| 2013/0193712 | A1 * | 8/2013 | Marcus | B60J 3/0208 296/97.3 |
| 2013/0286193 | A1 * | 10/2013 | Pflug | 348/135 |
| 2014/0097955 | A1 * | 4/2014 | Lovitt | B60Q 9/008 340/540 |

FOREIGN PATENT DOCUMENTS

| | | |
|---|---|---|
| DE | 102006007283 A1 | 8/2007 |
| EP | 1683668 A2 | 7/2006 |

OTHER PUBLICATIONS

International Patent Application No. PCT/US2014/061735; Int'l Search Report and the Written Opinion; dated Sep. 14, 2015; 11 pages.

* cited by examiner

*Primary Examiner* — Kee M Tung
*Assistant Examiner* — Frank Chen
(74) *Attorney, Agent, or Firm* — Baker & Hostetler LLP

(57) ABSTRACT

Methods and systems for augmenting situational awareness using a controllable window are described. An environmental condition within a field of view of the controllable window is determined. Light transmissivity of the controllable window is selectively changed based on the determined environmental condition. In some implementations, multiple points of view can be provided to multiple viewers.

20 Claims, 10 Drawing Sheets

AUGMENTED SITUATION AWARENESS

BACKGROUND

When operating an aircraft, the flight crew must ensure that cockpit procedures are followed while attending to the details necessary for the flight including instruments and settings, the destination and flight path, the weather, and so on. There are typically a large number of controls and displays inside the cockpit, such as systems that monitor the airplane's electrical, hydraulic, fuel and pressure systems, and a flight management system that manages the flight plan, speed control and navigation details. Various controls and displays also allow the crew to monitor the wind speed and direction, the fuel temperature and flow, cabin and cockpit pressure and temperature, and so on. Furthermore, the crew must visually inspect the outside surroundings through the windshield to ensure safe and efficient operations.

SUMMARY

Illustrative examples of the present disclosure include, without limitation, a method, device, and computer-readable storage medium. In one aspect, a method for controlling a windshield with selectively controllable areas of light transmissivity is described. An environmental condition within a field of view of the windshield is determined Light transmissivity on the windshield is selectively changed based on the determined environmental condition.

In another aspect, a windscreen apparatus is provided. The device may include a windscreen and a controller configured to calculate position of objects within a field of view of the windscreen. Light transmission properties of the windscreen is selectively controlled by the controller to cause changes in light transmissivity on the windscreen based on the calculated position of the objects within the field of view.

In another aspect, a system for augmenting situational awareness using a controllable w is provided. An environmental condition within a field of view of the controllable window is determined Light transmissivity of the controllable window is selectively changed based on the determined environmental condition.

The features, functions, and advantages that have been discussed can be achieved independently in various embodiments or may be combined in yet other embodiments, further details of which can be seen with reference to the following description and drawings.

BRIEF DESCRIPTION OF DRAWINGS

Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
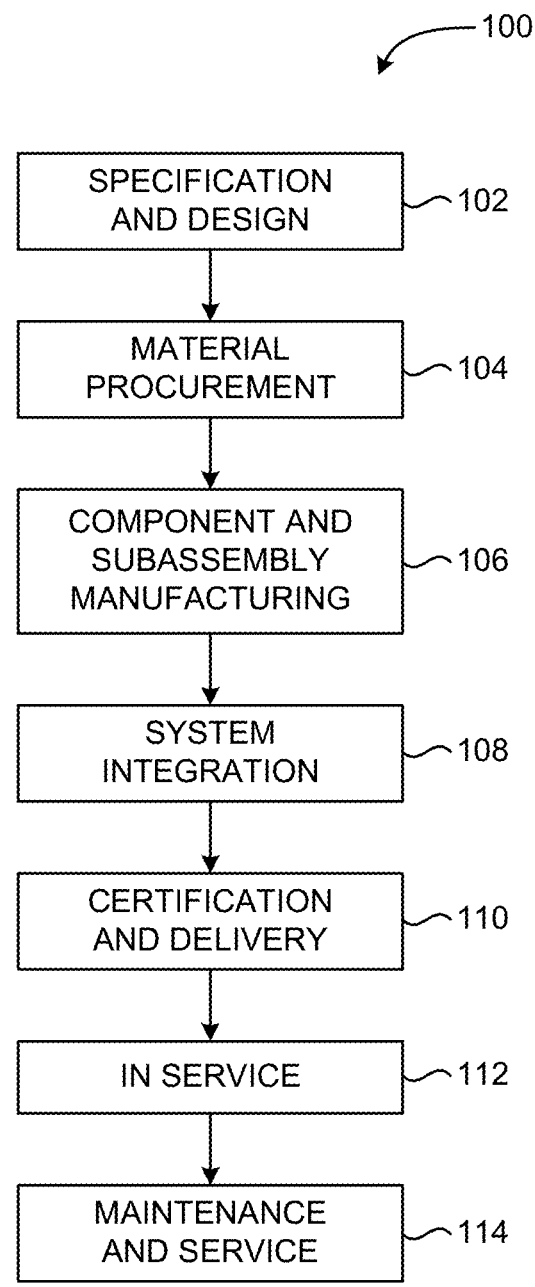
FIG. 1 depicts a flow diagram of an aircraft production and service methodology.
Figure 2:
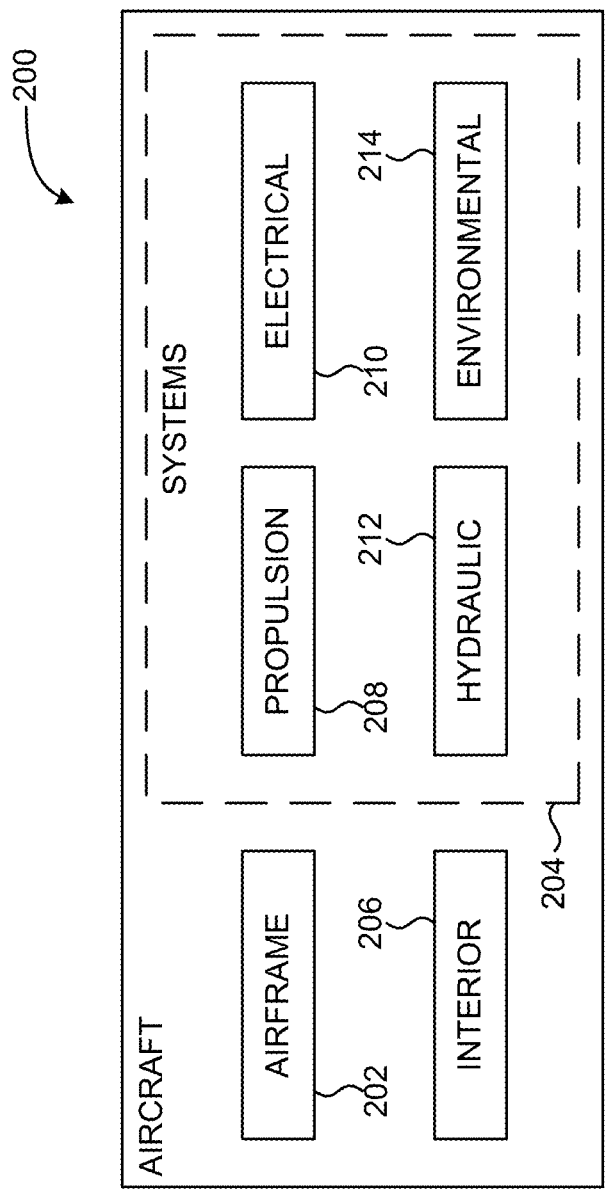
FIG. 2 depicts a block diagram of an aircraft.

Examples in this disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

In order to safely and efficiently operate an aircraft, the crew must typically ensure correct configuration of a large number instruments and controls while visually surveying the outside surroundings through the windshield to ensure safe and efficient operations. However, the varying nature of the weather, time of day, and location of the sun can impact visibility and thus affect the ability of the crew to perform their operations. Furthermore, some information is only available on a display and the crew must sometimes spend significant head down time to view the information.

To improve visibility conditions, pilots typically use sunglasses or transparent window shades to improve visibility in bright or challenging lighting conditions. For situational awareness the pilots may use a combination of information sources such as visual scanning and various onboard instruments and displays (e.g., traffic collision avoidance system (TCAS)). Described herein are various methods for improving crew visibility in various environmental and lighting conditions within the flight deck. The methods can allow for the highlighting of important events and objects within the crew's field of view on the windshield to improve situational awareness. For example, the described methods may allow for automatically improving viewing conditions in the cockpit based upon the ambient lighting. The improved viewing conditions may be provided for the whole cockpit, rather than for a part of the cockpit or for a particular crew member, for example by using sunglasses or window shields. In some implementations, multiple tint options may be provided to allow for greater visibility for the flight crew based upon the current conditions. While the term "windshield" is used in this disclosure, other terms such as windscreen may be used to refer to the windows of an aircraft or other vehicle. Additionally, the principles described herein may be applied in other types of windows installed in other structures and vehicles.

Additionally, in some implementations, information may be displayed directly on the windshield to provide additional situational awareness. Such information may include mission specific information that may be useful to the flight crew. By providing selected information on the windshield, the flight crew may be provided information in a readable way independent of outside environmental conditions. Furthermore, displaying mission specific information directly in the main viewing area of the pilot may reduce head down time and provide prompt situational awareness as the information becomes relevant. Information may be presented directly on the windshield without the need for additional instruments, and can help reduce clutter in the cockpit and allow for simplified training, easier build/design, and maintenance.

In some implementations, a dynamic window marking function can be provided that can identify unknown or unseen objects in the field of view that may otherwise be difficult to view using visual or other means. Systems such as TCAS II and Air Traffic Control (ATC) radar have limitations in what can be detected. In one implementation, a combination of onboard sensors and cameras and other technologies may be used to detect and display objects of interest on a windshield. If the object is not identifiable, data from onboard sensors and cameras may be used to dynamically highlight appropriate areas on the windscreen for direct visual identification by the flight crew.

Figure 3:
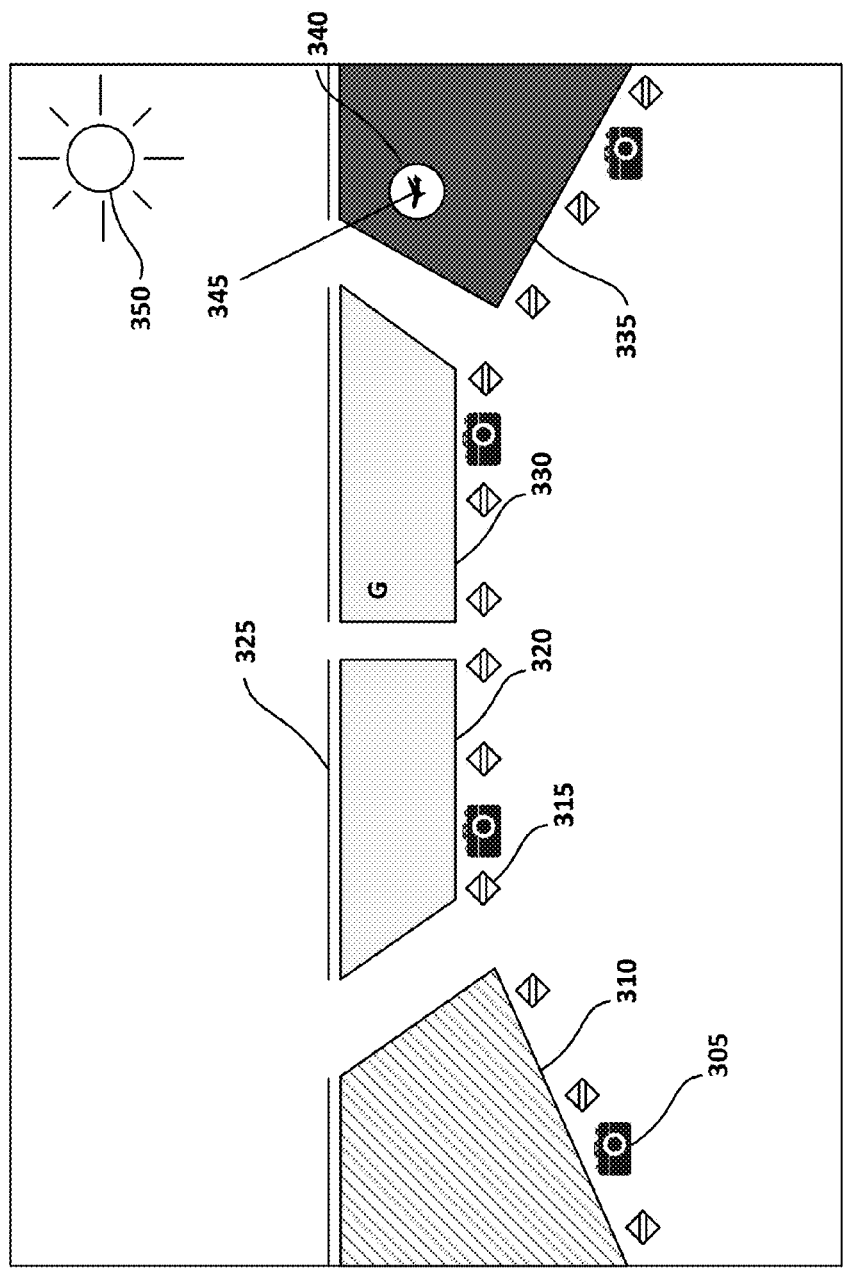
FIG. 3 depicts elements of a system for controlling a windshield.
Figure 4:
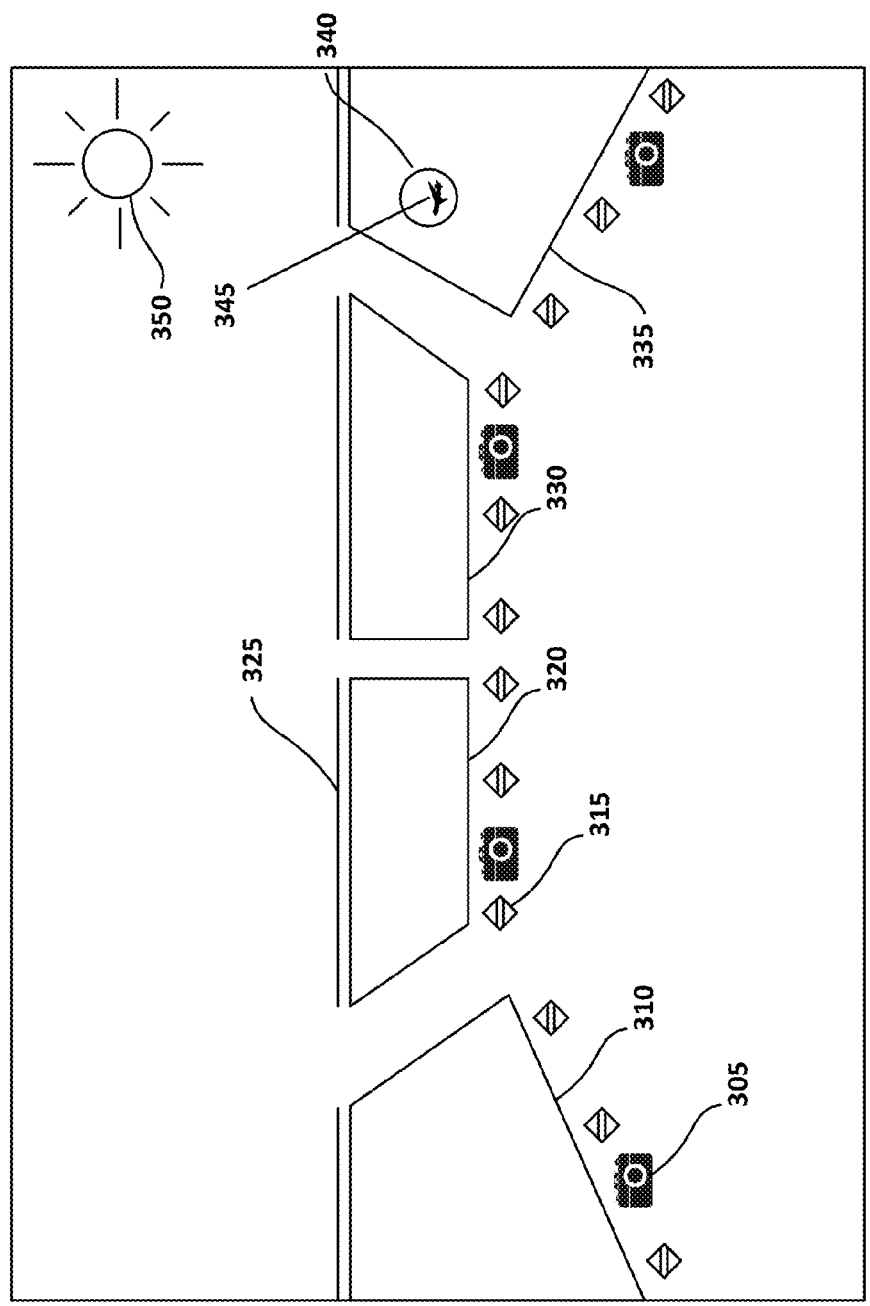
FIG. 4 depicts elements of a system for controlling a windshield.

FIGS. 3 and 4 illustrate windscreens that include a display overlay that may be used in some implementations. In some implementations, the overlay may be provided without a reflective or absorbing layer behind the panel. Alternatively, the marking capability may be incorporated directly into the windscreen. In some implementations, the overlay can be a thin film transistor liquid crystal display (TFT LCD). Other technologies can be used to provide marking and tinting, such as smart glass technologies that allow changes to light transmission properties of the windshield glass when voltage, light or heat is applied. Various technologies that control the amount of light transmission on the windscreen may be used, such as electrochromic, photochromic, thermochromic, suspended particle, micro-blind and liquid crystal devices.

Controllers and other devices for the tinting and marking functions may be embedded in the bezel of the screen or other suitable locations. Additionally, cameras for detection of objects and light sensors may be implemented to identify objects in the field of view and outside environmental conditions. Objects and hazards may be detected based on camera input (e.g., using object recognition), which may be useful in particular where specific data is not directly available otherwise, such as when birds and other unidentified objects such as unidentified aircraft and towers are in view. When specific data is available from other systems, this information may be integrated to allow usage of data from ATC radar, automatic dependent surveillance broadcast (ADS-B), System Wide Information Management (SWIM), various navigation and mapping databases, or other systems. Using information from such sources, the windshield may be controlled to mark objects such as aircraft, obstacles, or other mission pertinent information. Markings may be presented directly on the windshield using the overlay or other technologies.

FIG. 3 illustrates one example implementation of a windshield in accordance with this disclosure. In situations with bright daylight conditions, the position of the sun may be detected and the windshield panels may be darkened based on the position of the sun as detected by sensors and/or cameras as described above. FIG. 3 illustrates four windshield panels 310, 320, 330, and 335. Controllers 325 for the windshield panels 310, 320, 330, and 335 may be embedded in the bezels as shown or in other suitable locations. Cameras 305 may be positioned to capture images in the field of view of the windshield panels 310, 320, 330, and 335. A number of sensors 315 may also be provided to determine a number of conditions. Based on inputs from the cameras 305, sensors 315, and other systems, windshield panel 310, which is furthest from the sun 350, may be tinted differently than windshield panels 320, 330, and 335 based on the detected position of the sun 350. Windshield panels 320 and 330 may be tinted differently from windshield panel 310 and 335 based on their relative locations. Windshield panel has the greatest amount of tinting due to the location of the sun 350. Furthermore, marking of objects can, in some implementations, be performed by not darkening the area around a detected object relative to other areas. For example, the detected aircraft 345 may be in the field of view of windshield panel 335, and although the windshield panel 335 is tinted to accounted for the position of the sun 350, an area 340 may be less tinted relative to the rest of the windshield panel 335 to allow the flight crew to more easily see the aircraft 345. Additionally, in some implementations additional marking may be provided around the object area, such as an aircraft identifier, arrows to guide the viewer, and so forth.

FIG. 4 illustrates another example implementation of a windshield in accordance with this disclosure. In situations where a low amount of outside illumination is detected, the windshield panels 310, 320, 330, and 335 can be set to be completely or substantially transparent. Marked objects may still be visible due to the available indirect lightning. Additionally, in low visibility situations such as fog or when the aircraft is flying through a cloud, a color filter may be rendered on the windshield panels 310, 320, 330, and 335 based on the detected environmental conditions.

In some implementations, the available outside light may be used as the backlight for the windshield. Alternatively, a mixture of outside light and active light sources may be provided. Additionally, rendered data may include information other than object marking. Any information that may be useful for the flight crew can be rendered on the windshield panels. For windshields that implement higher resolution capability (e.g., 70 pixels per inch), the rendered information can provide complex and useful augmented displays that can aid the flight crew while viewing the outside area through the windshield.

Figure 5:
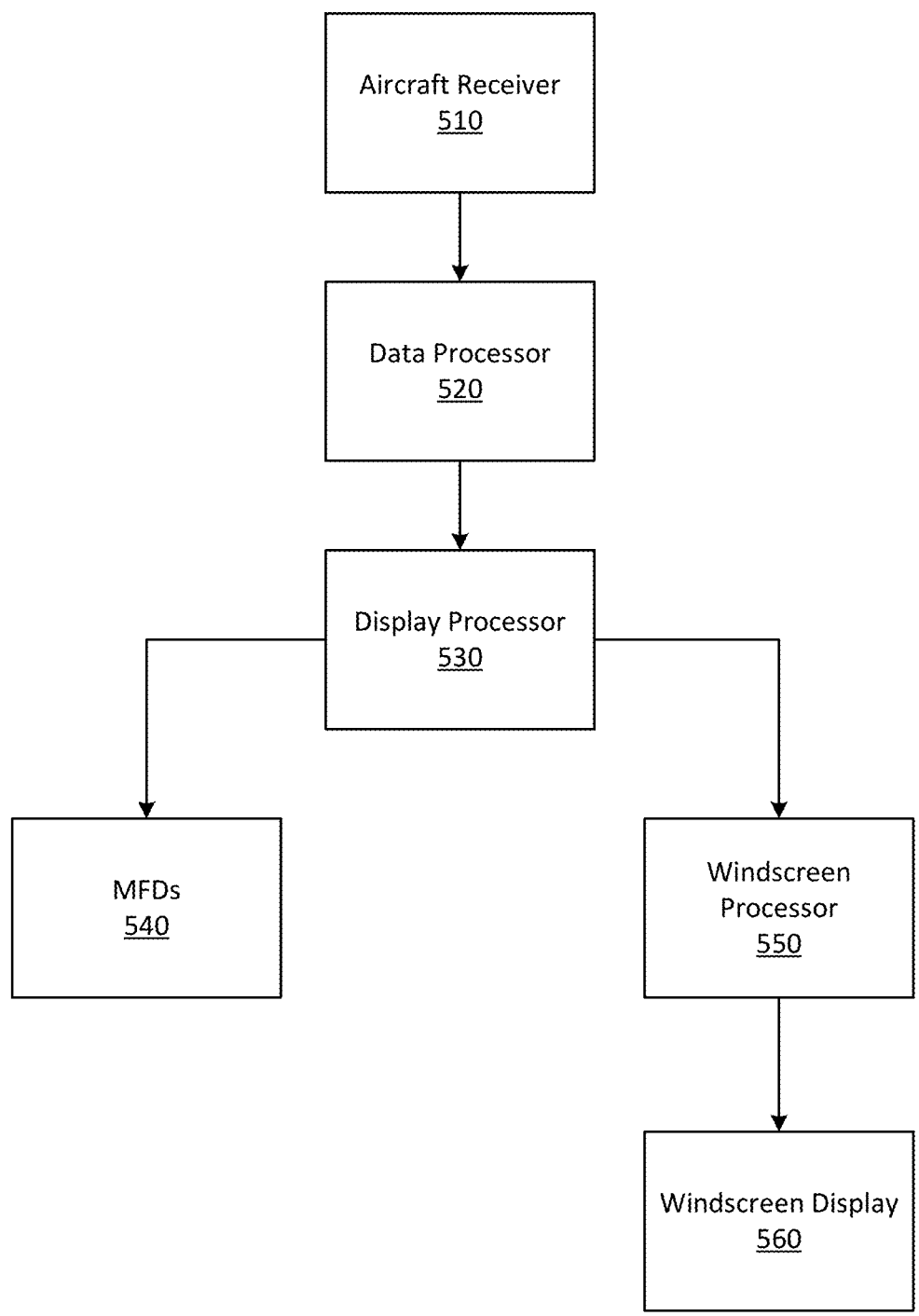
FIG. 5 depicts an example system may be used in conjunction with the present disclosure.

In some implementations, information may be directly received from the onboard equipment and may be rendered on the windscreen to provide an additional rendering of information provided in the flight deck controls and displays. FIG. 5 illustrates an example system for controlling a windscreen. Referring to FIG. 5, an aircraft receiver 510 may receive information pertaining to a flight, such as flight, navigation, or weather data. A data processor 520 may analyze and process the received information and send the processed information to a display processer that manages and controls information for display in the flight deck including the windscreen. Some information may be displayed on a multi-function display (MFD) 540, and some information may be sent to a windscreen processor 550 for rendering on the windscreen 560.

Figure 6:
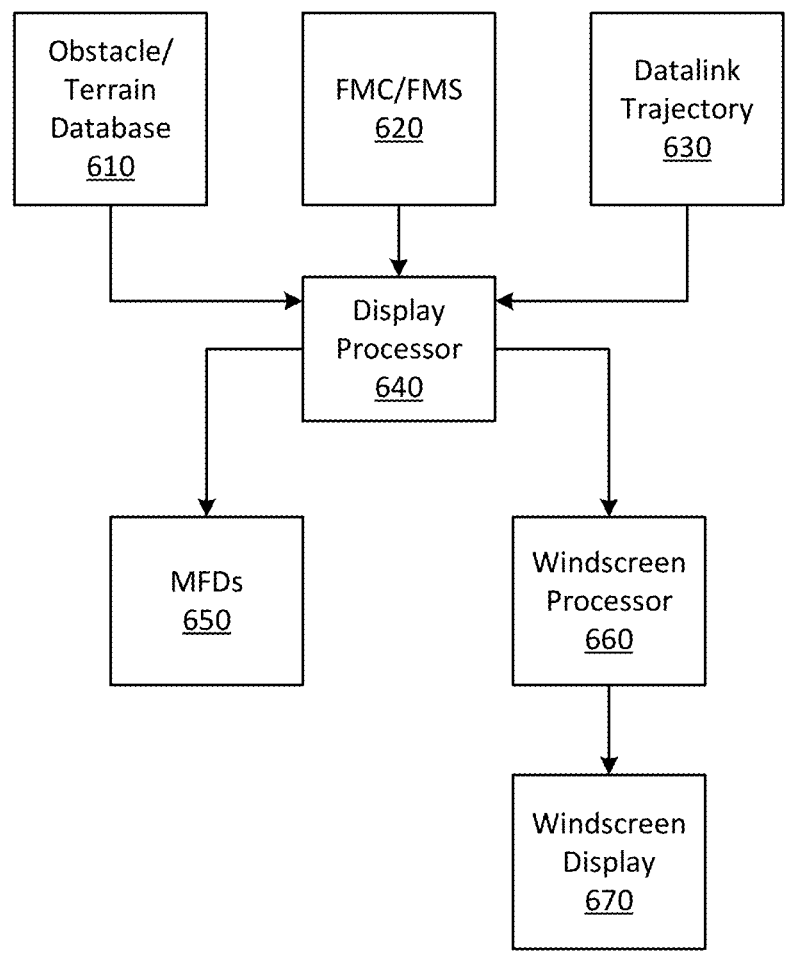
FIG. 6 depicts an example system may be used in conjunction with the present disclosure.

In some implementations, additional information may be displayed in a similar fashion, as supplemented by an onboard database, flight management system (FMS) or flight management computer (FMC), or information receiving via a datalink system. FIG. 6 illustrates another example system for controlling a windscreen. Referring to FIG. 6, a display processor 640 may receive information pertaining to a flight, such as obstacle/terrain data from an obstacle/terrain database 610, FMC/MFS 620, and datalink trajectory data 630. Display processor 640 may analyze and process the received information and send the processed information for display in the flight deck including the windscreen. Some information may be displayed on a multi-function display (MFD) 650, and some information may be sent to a windscreen processor 660 for rendering on the windscreen 670.

The following list provides examples of information that may be displayed using the methods described herein:

Marking obstacles and other objects (e.g., using image/video recognition and on-board/ground system data)

Marking risk areas (e.g., weather hotspots)

Display of route elements (e.g., 4D trajectories/"tunnel in the sky")

Display of taxi information (e.g. turn right by 120 degrees in 200 meters)

Textual information (e.g., display of waypoint names or towns)

Heads-up display data with tactical information rendered on windshield instead of a helmet.

In implementations, a touch-sensitive layer may be added if the windshield is within reach of the flight crew to allow for direct interaction with the rendered information. Additionally or optionally, gesture recognition technology may be used to allow for the flight crew to interact with the information without the need for special input devices such as keyboards or control sticks. In some implementations, 3D viewing capability may also be provided, in some cases in combination with gesture recognition. For example, using stereoscopic technologies further discussed herein, content may be rendered in 3D so that images appear to be in space beyond the aircraft/vehicle and not just as a marked area of the windshield.

Figure 7:
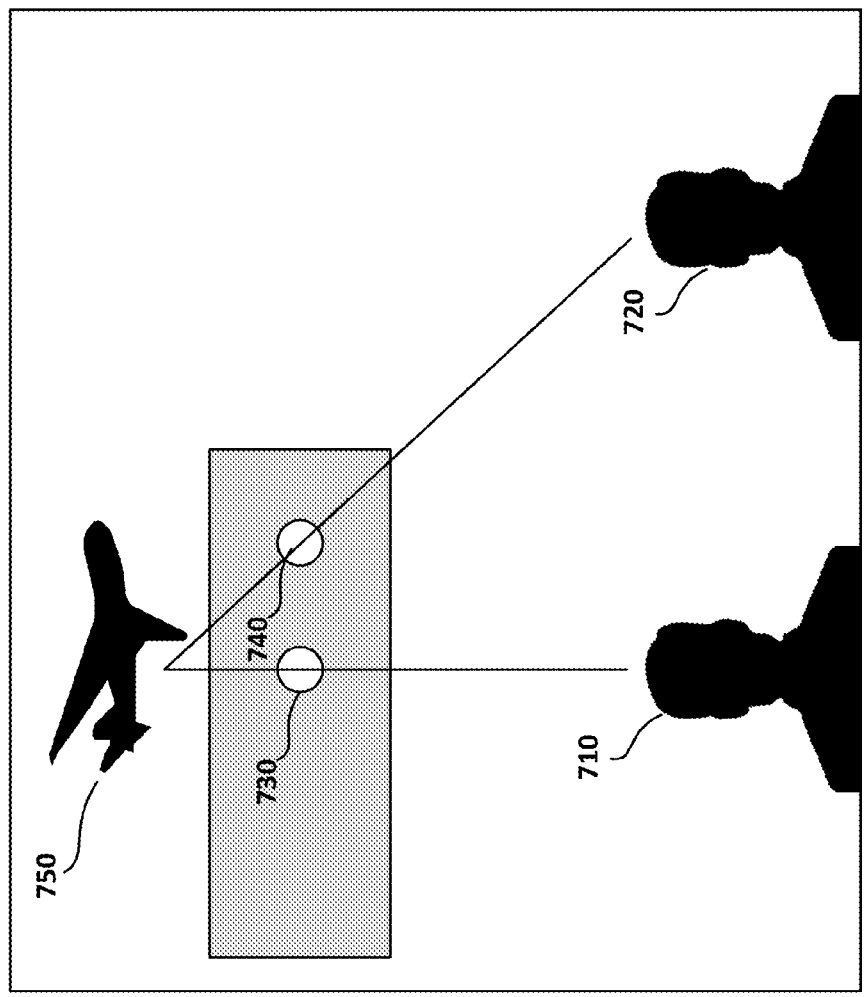
FIG. 7 depicts an example of providing markings for two viewers.

In some implementations, the windscreen may be configured to render information while allowing for different content based on a predetermined eye position for multiple viewers. To ensure that the viewers (e.g., pilot and copilot) can correctly view the rendered information in their respective positions with appropriate corrections for parallax error, auto-stereoscopic technologies can be applied. The windscreen processor may calculate different images depending on the designed eye position. Additional eye positions can be accounted for so that additional persons in the cockpit can be provided with appropriately rendered views. Using auto-stereoscopic display technology, each viewer may be provided with a personalized image based on a predetermined head/eye position for each viewer. The different rendered images can be substantially similar to what other viewers see or can be significantly different depending on the predetermined locations of the viewers and the location of the object in the field of view. Referring to FIG. 7, viewer 710 may be presented with marking 730 that highlights the object 750, whereas viewer 720 is presented with marking 740 that highlights the object 750. In some implementations, by using auto-stereoscopic effects the viewer 710 may not not see marking 740 and viewer 720 may not see marking 730. By using such technologies, the windscreen can effectively act as two different and independent displays. In some implementations, lenticular lens layer technology may be incorporated, for example by using a plurality of magnifying lenses arranged so that different images may be magnified when viewed from different angles. One skilled in the art will recognize that other technologies providing similar functionality (i.e., allowing two different viewers to see the same or specifically different content) can also be implemented.

For side displays and the outermost areas such as the side window panels in a cockpit, it may be sufficient to render the same marking to multiple viewers. In this case it may be adequate to ensure that, for example, a larger marking area is provided to allow two or more viewers to see the marking.

In some implementations, the viewers may be provided the capability to configure the types of information that the viewers want to see and have marked. Furthermore, by using independent virtual displays, a higher degree of personalization may be provided.

By using the techniques described herein, information may be displayed directly on the windshield without the need for additional instrumentation. Auxiliary hardware such as special glasses for augmented reality are not required and the parallax error (the apparent change in the position of an object resulting from a change in position of the observer) may be avoided. Furthermore, the principles described herein may be applied with multiple view points and is not limited to one or two positions. The density of pixels for windshield marking may be considered for determining the number of viewpoints that may be provided. For example, it may be possible to provide less pixels if only one or two viewing points are provided.

By providing for eye positions of multiple viewers, independent display information may be provided based on the particular viewpoint. In some implementations, the same image may be provided with a changed projection to provide a different image.

The principles described herein can be applied in environments other than a cockpit. For example, some example applications include automobiles, ships, or an ATC tower.

In some implementations, collection of information may be performed using image capture techniques, and image recognition technologies may be used to identify objects in the field of view. There are a plurality of features on a captured image that can be extracted to provide a feature description of the object. Such feature descriptors for an image can then be used to identify the object when attempting to locate the object in an image containing other objects. An image recognition algorithm may be used to extract feature descriptors and match the extracted features to recognize the image. A feature descriptor may be a distillation of a portion of an image to a set of definition data that can be referenced for identification purposes. Image areas for objects that may be referenced as the basis of descriptive features may be used for identification purposes. Those skilled in the art will recognize that a specific definition of a feature descriptor will depend on the particular application and algorithm, and all such definitions are contemplated as within the scope of the present disclosure.

Figure 8:
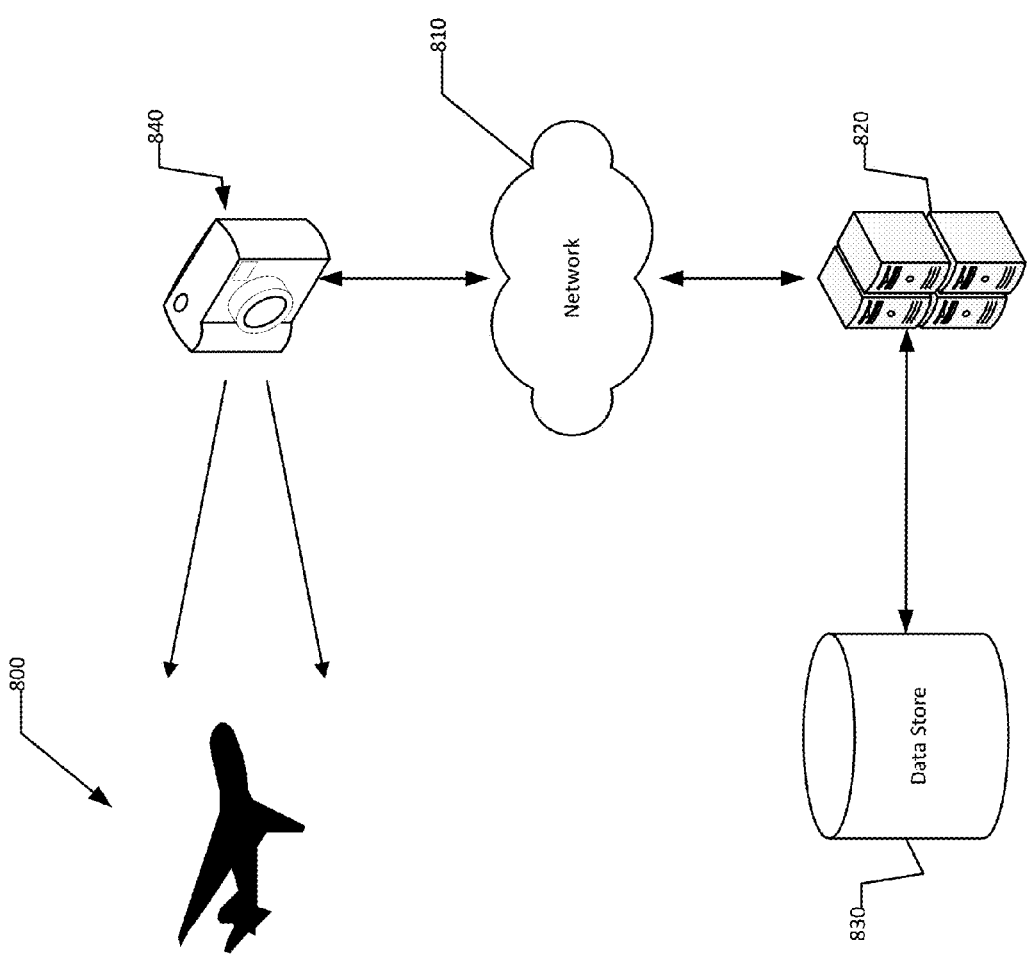
FIG. 8 depicts an example system may be used in conjunction with the present disclosure.

In one example implementation illustrated in FIG. 8, a device 840 with an image capture capability may capture an image of an object 800. The captured image file may be transmitted via a network 810 to system 820 that may comprise one or more computers hosting at least one application that receives the transmitted image and analyzes the image to extract feature descriptors. Device 840 may further include a location determination capability using GPS or other have access to other location determination means, and may transmit the location information along with the image data. System 820 may further have access to data store 830 that may comprise a database of predetermined objects associated with a number of feature descriptors. System 820 may query the data store 830 for a matching object based on the feature descriptors extracted from the image transmitted by device 840. If a match is found, data store 830 may further return metadata associated with a matched object. System 830 may then transmitted the returned metadata to device 840 via network 810, whereupon the device 840 may send the metadata to a display processor such as display processor 530 of FIG. 5 for rendering the received metadata and/or merge the received metadata with a currently rendered image. Alternatively, the metadata may be sent directly to a display processor such as display processor 530 of FIG. 5.

Those skilled in the art will readily recognize that each particular processing component may be distributed and executed by the user device and servers and other components in the network. For example, metadata extraction and object recognition can be handled by the device or by the server.

Identification of objects and matching objects against databases and systems such as ADS-B can allow for a high level of trust in the gathered data. Highlighting on the windscreen can be augmented using metadata to provide information such as the flight number of an identified aircraft as well as departure and destination.

In one implementation, the following information may be matched by a display processor to determine the position of an object and display the object:
Current position of the aircraft
Heading of the aircraft
Current speed of the aircraft
Identified object position in 3D (this may be performed via triangulation of at least two images and knowledge of the speed and direction in combination with the current position.

By combining the known 3D position of the identified object or area with the aircraft position and the known direction of the windshield, the correct position for highlighting on the windscreen can be calculated. In one implementation, an extension of the predetermined eye position can be matched to the identified object in 3D space. Further verification that the correct object was detected can be provided if a known object is identified (e.g., an aircraft is also identified by ADS-B data).

In some implementations, data for the on-board systems can be provided by an on-aircraft database or provided from the ground via a data-link. The information may be linked to the on-board system and the display processor can search the database to determine a match between the identification of a possible object/hotspot and the database to provide further information.

By using the techniques described herein, highlighting of important events and objects within the crew's field of view on the windshield can be provided to improve situational awareness without using devices such as special glasses. Furthermore, by designing the windshield markings to account for predetermined viewing positions, the tracking of head position and eye movements can be avoided.

Figure 9:
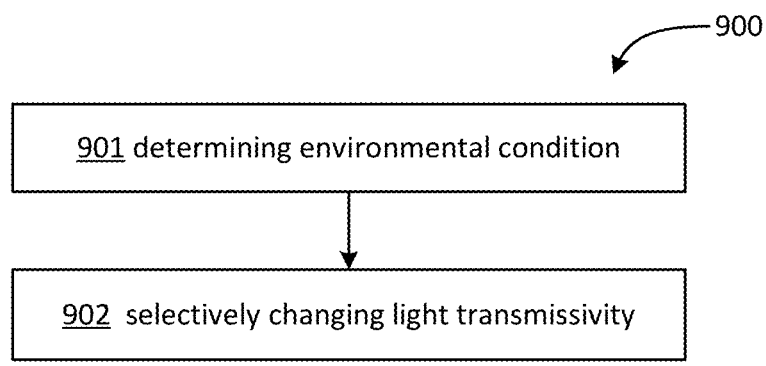
FIG. 9 depicts an example procedure for controlling a windshield in accordance with this disclosure.

FIG. 9 illustrates an example operational procedure 900 for controlling a windshield with selectively controllable areas of light transmissivity. Referring to FIG. 9, operation 901 illustrates determining an environmental condition within a field of view of the windshield. Operation 901 may be followed by operation 902. Operation 902 illustrates selectively changing light transmissivity on the windshield based on the determined environmental condition.

Figure 10:
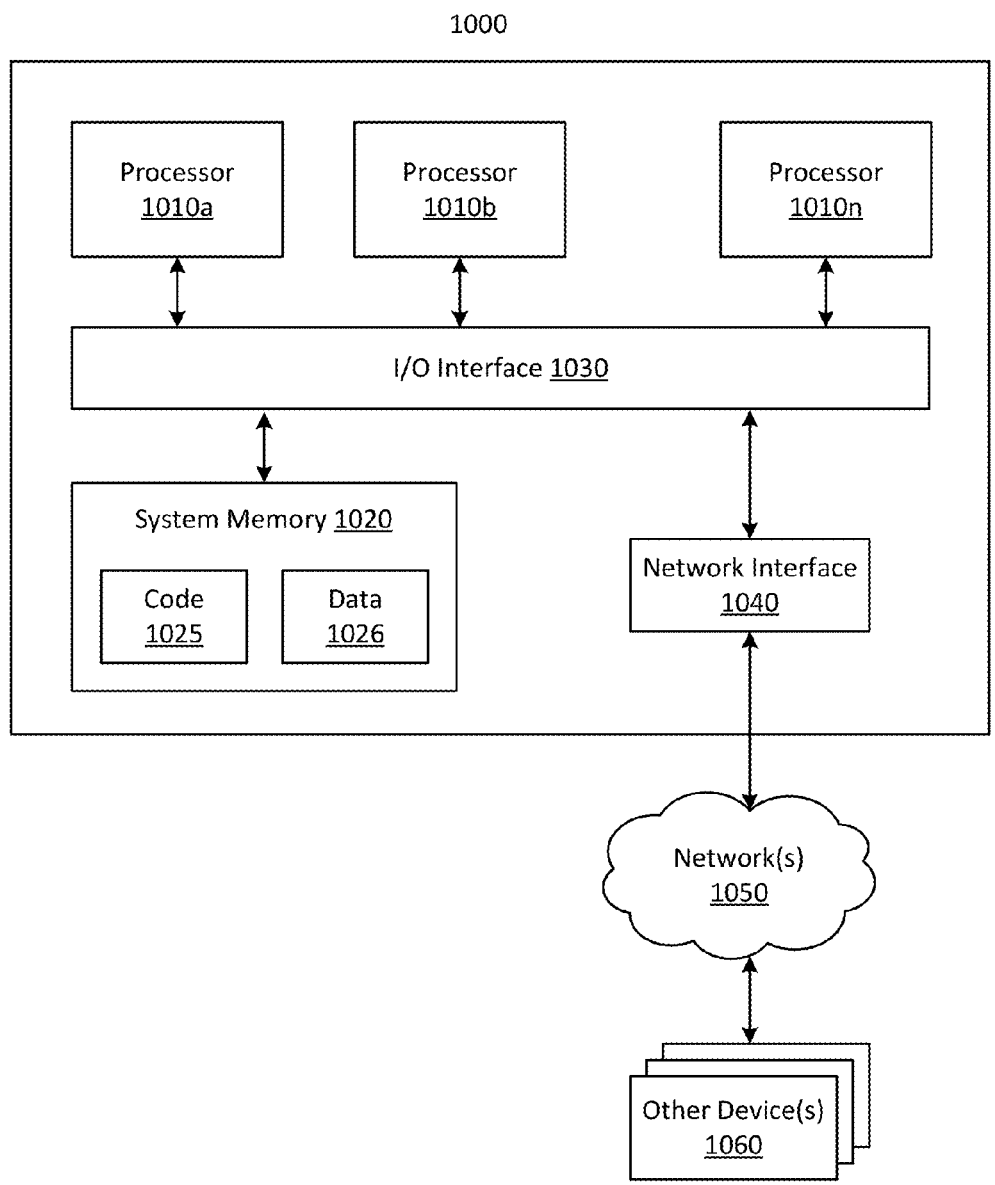
FIG. 10 is a diagram illustrating an example computing system that may be used in some examples.

FIG. 10 and the following discussion are intended to provide a brief general description of a suitable computing environment in which the methods and systems disclosed herein and/or portions thereof may be implemented. For example, the functions described may be performed by one or more devices that include some or all of the aspects described in regard to FIG. 10. Some or all of the devices described in FIG. 10 that may be used to perform functions of the claimed examples may be configured in other devices and systems such as those described herein. Alternatively, some or all of the devices described in FIG. 10 may be included in any device, combination of devices, or any system that performs any aspect of a disclosed example.

Although not required, the methods and systems disclosed herein may be described in the general context of computer-executable instructions, such as program modules, being executed by a computer, such as a client workstation, server or personal computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations, including handheld devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

In at least some embodiments, a computing device that implements a portion or all of one or more of the technologies described herein, including techniques for controlling a windshield with selectively controllable areas of light transmissivity, may include a general purpose computer system that includes or is configured to access one or more computer-accessible media. FIG. 10 illustrates such a general purpose computing device 1000. In the illustrated embodiment, computing device 1000 includes one or more processors 1010a, 1010b and/or 1010n (which may be referred herein singularly as "a processor 1010" or in the plural as "the processors 1010") coupled to a system memory 1020 via an input/output (I/O) interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight or another suitable number). Processors 1010 may be any suitable processors capable of executing instructions. For example, in various embodiments, processors 1010 may be general purpose or embedded processors implementing any of a variety of instruction set architectures (ISAs), such as the x106, PowerPC, SPARC, or MIPS ISAs or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 1020 as code 1025 and data 1026.

In one embodiment, I/O interface 1030 may be configured to coordinate I/O traffic between processor 1010, system memory 1020 and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices as illustrated in FIGS. 1 through 10, for example. In various embodiments, network interface 1040 may support communication via any suitable wired or wireless general data networks, such as types of Ethernet networks, for example. Additionally, network interface 1040 may support communication via telecommunications/telephony networks such as analog voice networks or digital fiber communications networks, via storage area networks such as Fibre Channel SANs or via any other suitable type of network and/or protocol.

In some embodiments, system memory 1020 may be one embodiment of a computer-accessible medium configured to store program instructions and data as described herein for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1000 as system memory 1020 or another type of memory. Portions or all of multiple computing devices such as those illustrated in FIG. 10 may be used to implement the described functionality in various embodiments; for example, software components running on a variety of different devices and servers may collaborate to provide the functionality. In some embodiments, portions of the described functionality may be implemented using storage devices, network devices or special purpose computer systems, in addition to or instead of being implemented using general purpose computer systems. The term "computing device," as used herein, refers to at least all these types of devices and is not limited to these types of devices.

Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, Internet appliances, and various other products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will be appreciated that, while various items are illustrated as being stored in memory or on storage while being used, these items or portions of them may be transferred between memory and other storage devices. Alternatively, in other examples some or all of the software modules and/or systems may execute in memory on another device and communicate with the illustrated computing systems via inter-computer communication. In some examples, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

It will be appreciated that in some examples the functionality provided by the routines discussed above may be provided in alternative ways, such as being split among more routines or consolidated into fewer routines. Similarly, in some examples, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other examples the operations may be performed in other orders and in other manners. Similarly, the data structures discussed above may be structured in different ways in other examples, such as by having a single data structure split into multiple data structures or by having multiple data structures consolidated into a single data structure, and may store more or less information than is described (e.g., when other illustrated data structures instead lack or include such information respectively or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed:

1. A windscreen apparatus for an aircraft comprising:
at least one windscreen; and
a controller configured to calculate position of objects within a field of view of the at least one windscreen;
wherein:
the objects include one or more of aircraft, weather hotspots, or other hazards;
the objects are detected based on image data from on-board image sensors and on-board or system data;
light transmission properties of the at least one windscreen is selectively controllable by the controller to cause changes in light transmissivity of selected portions of the at least one windscreen based on the calculated position of the objects within the field of view;
the calculated position of the objects is calculated based on known 3D positions of the objects and a calculated position of the at least one windscreen and a calculated direction and speed of the at least one windscreen;
portions of the at least one windscreen are selectively tinted with a first tint option of a plurality of tint options;
a selected subset of the portions of the at least one windscreen are selectively tinted with a second tint option of the plurality of tint options based on the 3D positions of the objects, the position of the at least one windscreen, the direction of the at least one windscreen, and a position of a calculated head/eye position of at least one viewer; and
the second tint option is selected so as to reduce an amount of tint for an area around and including a selected object.

2. The windscreen apparatus of claim 1, wherein light transmission properties of the at least one windscreen is selectively controllable by the controller to cause rendering of textual or graphic information on the at least one windscreen based on the calculated position.

3. The windscreen apparatus of claim 1, wherein the light transmission properties of the at least one windscreen is selectively controllable based on at least two different viewing positions.

4. The windscreen apparatus of claim 1, wherein the at least one windscreen comprises an overlaid LCD layer.

5. The windscreen apparatus of claim 1, wherein the at least one windscreen comprises embedded particles for controlling light transmissivity.

6. The windscreen apparatus of claim 1, wherein the light transmission properties of the at least one windscreen is further selectively controllable based on input from light sensors.

7. The windscreen apparatus of claim 1, wherein the light transmission properties of the at least one windscreen is further selectively controllable based on input from an imaging device.

8. The windscreen apparatus of claim 7, wherein the light transmission properties of the at least one windscreen is further selectively controllable based on analysis of the input from the imaging device to recognize the objects within the field of view.

9. The windscreen apparatus of claim 1, wherein the windscreen apparatus is installed on an aircraft and the controller is communicatively coupled with at least one system of the aircraft.

10. A method for controlling an aircraft windshield with selectively controllable areas of light transmissivity, the method comprising:
- calculating position of objects within a field of view of the windshield, wherein the objects include one or more of aircraft, weather hotspots, or other hazards and the objects are detected based on image data from on-board image sensors and on-board or system data;
- calculating positions of the objects based on known positions of the objects and a calculated position of the windshield, a calculated direction of the windshield, and a speed of the windshield;
- selectively changing light transmissivity of portions of the windshield to cause tinting with a first tint option of a plurality of tint options; and
- selectively changing a selected subset of the portions of the windshield with a second tint option of the plurality of tint options based on the position of the windshield, 3D positions of the objects within the field of view of the windshield, the calculated position of the windshield, the calculated direction of the windshield, and a position of a calculated head/eye position of at least one viewer;
- wherein the second tint option is selected so as to reduce an amount of tint for an area around and including a selected object.

11. The method of claim 10, wherein the object is an environmental condition within the field of view of the windshield.

12. The method of claim 10, wherein the object is the sun, and the selectively changing comprises selectively darkening a portion of the windshield in the field of view.

13. The method of claim 11, wherein the environmental condition is determined to be a nighttime condition, and the selectively changing comprises causing the transmissivity to be transparent.

14. The method of claim 11, wherein the environmental condition is determined to be a low visibility condition, and the selectively changing comprises causing the windshield to implement a color filter.

15. The method of claim 10, wherein the selectively changing is further based on input from light sensors.

16. The method of claim 10, wherein the selectively changing is further based on input from an imaging device.

17. The method of claim 16, further comprising determining a current position and velocity of the object.

18. The method of claim 17, wherein the selectively changing is further based on a predetermined eye position of a first viewer.

19. The method of claim 18, wherein the selectively changing is further based on a predetermined eye position of a second viewer, wherein light transmissivity in at least two areas of the windshield is selectively changed so that the eye positions of the first and second viewers are accounted for.

20. A system for augmenting situational awareness using a controllable window, the system comprising:
- means for calculating position of objects within a field of view of the controllable window, wherein the objects include one or more of aircraft, weather hotspots, or other hazards and the objects are detected based on image data from on-board image sensors and on-board or system data;
- means for calculating positions of the objects based on known positions of the objects and a calculated position of the controllable window, a calculated direction of the controllable window, and a speed of the controllable window;
- means for selectively changing light transmissivity of portions of the controllable window to cause tinting with a first tint option of a plurality of tint options; and
- selectively changing a selected subset of the portions of the controllable window with a second tint option of the plurality of tint options based on the position of the controllable window, positions of the objects within the field of view of the controllable window, the calculated position of the controllable window, the calculated direction of the controllable window, and a position of a calculated head/eye position of at least one viewer;
- wherein the second tint option is selected so as to reduce an amount of tint for an area around and including a selected one of the objects.

* * * * *